Sept. 25, 1928.  
J. F. O'CONNOR  
SHOCK ABSORBING MECHANISM  
Filed Aug. 30, 1926  
1,685,176  
2 Sheets-Sheet 1
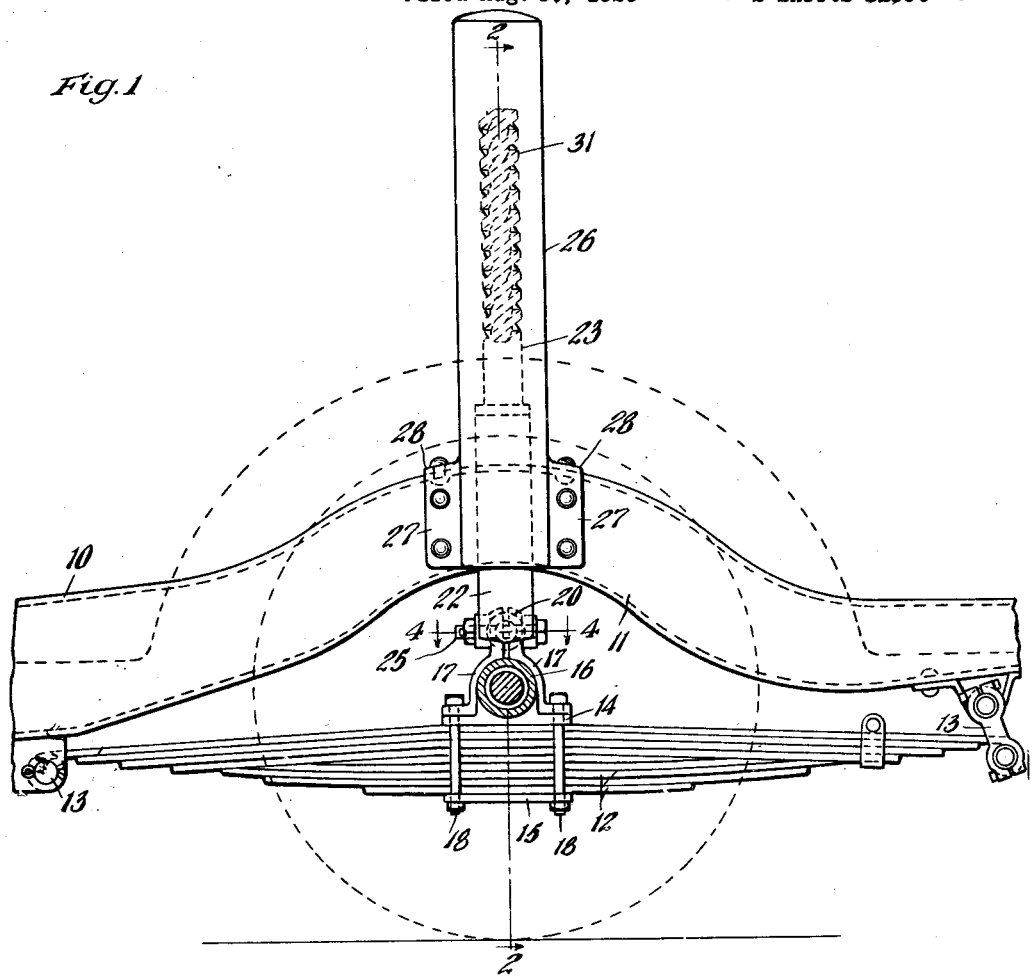
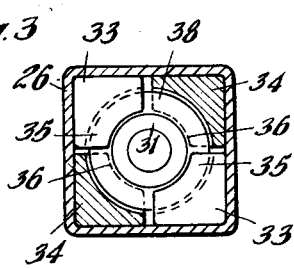
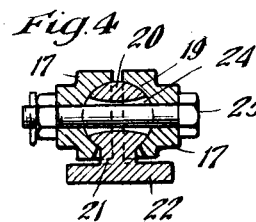
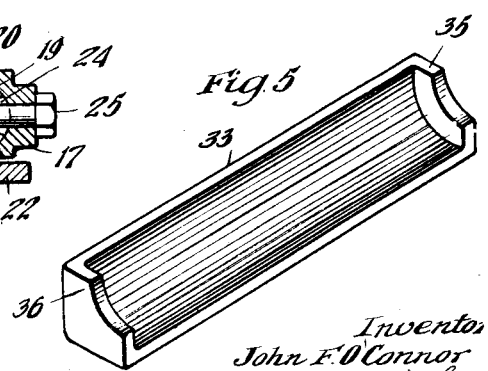

Sept. 25, 1928.
J. F. O'CONNOR
1,685,176
SHOCK ABSORBING MECHANISM
Filed Aug. 30, 1926
2 Sheets-Sheet 2
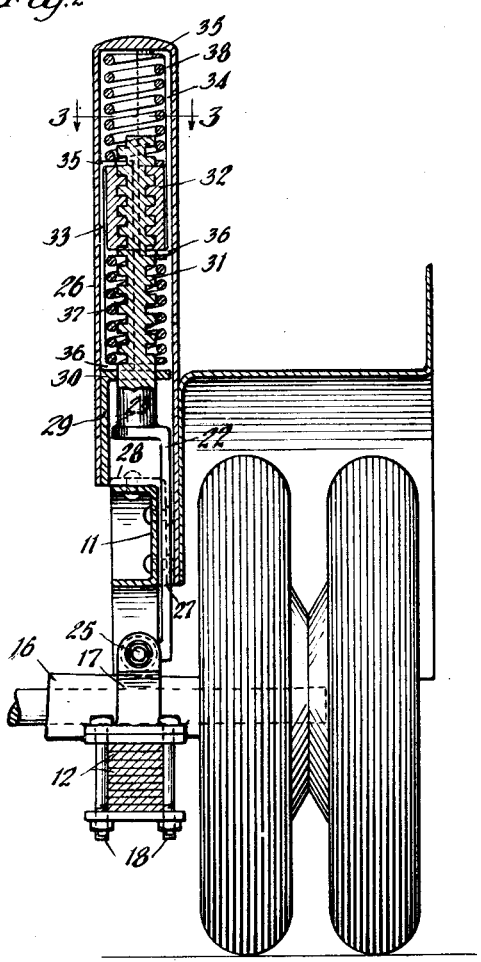
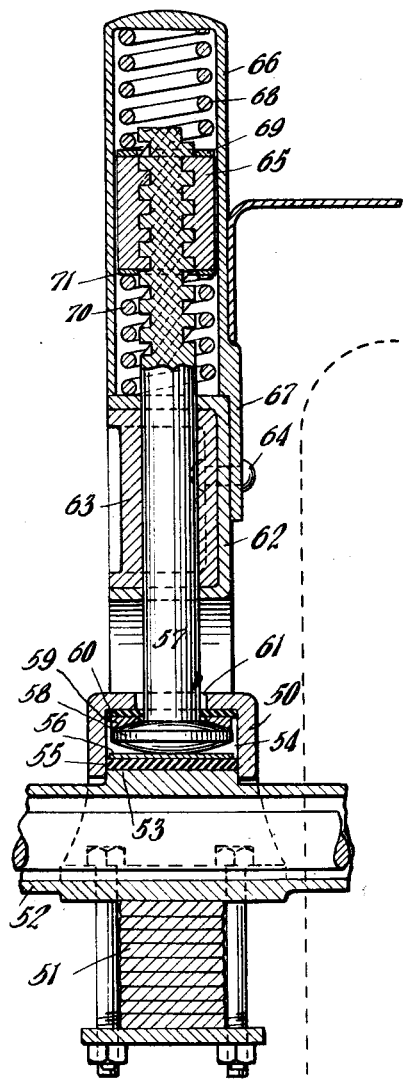
Witness
Wm. Geiger
Inventor
John F. O'Connor
By George I. Haight
His Atty.

Patented Sept. 25, 1928.

1,685,176

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

SHOCK-ABSORBING MECHANISM.

Application filed August 30, 1926. Serial No. 132,484.

This invention relates to shock absorbing mechanism.

An object of this invention is to provide a shock absorbing mechanism more particularly adapted to be applied to motor vehicles, such as busses and the like, without the necessity for altering the usual construction thereof or mutilating the same in an injurious manner.

A further object of the invention is to provide a shock absorbing device comprising a mechanism adapted to be affixed to the chassis and axle housing of the vehicle and including a tandem spring arrangement adapted to co-act with friction means to afford a combined maximum resilient and frictional resistance in opposite directions against shock due to relative movement between said axle and chassis, and wherein the device automatically adjusts itself for use in connection with vehicles of different types.

Other and further objects of the invention will more clearly appear from the description and claims hereinafter following.

In the drawings, Figure 1 is a fragmentary side elevational view of an automobile chassis, and the rear spring of the vehicle, showing my invention in connection therewith. Figure 2 is a transverse vertical sectional view of the invention corresponding substantially to the line 2—2 of Figure 1, and showing parts of the construction in elevation. Figure 3 is a horizontal sectional view through the shell or housing taken on the line 3—3 of Figure 2. Figure 4 is a horizontal sectional view on the line 4—4 of Figure 1. Figure 5 is an enlarged perspective detailed view of one of the yoke members used in connection with the invention. Figure 6 is a vertical sectional view, similar to Figure 2, on an enlarged scale, showing a somewhat different embodiment of the invention.

As shown in the drawings, 10 represents a side frame member of the usual channel formation having a curved off-set 11, which is spanned by the usual assembly 12 of leaf springs secured to the frame or chassis member 10 by suitable shackles indicated at 13—13, the spring assembly intermediate its ends being secured together by means of spaced plates 14 and 15 disposed at the upper and lower surfaces thereof, the plate 14 being part of the axle housing indicated at 16, said axle housing being held in position by the bearing members indicated at 17, the latter together with the plates 14 and 15 being held in position by bolts indicated at 18.

In carrying out the invention the upper ends of the holding member 17 are hollowed out as indicated at 19 to provide bearings for a ball 20 on an angular extension 21 formed integrally with the off-set connecting portion 22 of the plunger 23. The ball 20 is provided with a bore 24 flared from an intermediate point towards its opposite ends and adapted for the accommodation of a bolt 25 extending therethrough, and through the upper end portions of the holding members 17, thereby providing what is in effect a universal connection with the spring assembly 12.

The portion 22 of the plunger 23 is off-set as shown for the purpose of clearing the frame member 11, the plunger 23 being adapted to reciprocate within a casing or housing 26. The casing or housing 26 is polygonal in cross section, as shown in Figure 3 and closed at its upper end, the lower end of said housing being open, and provided with laterally extending vertical flanges 27—27 adapted to be riveted to the web of the chassis member 11, and with horizontal flanges 28—28 riveted to the top flange of the frame member 11, the wall of the housing between the flanges 27—27 extending downwardly at the outside of and in spaced relation with reference to, the web of the channel member 11, as shown, the outer surface of said web and the inner surface of the extended wall of the housing providing a guideway through which the off-set portion 22 of the plunger extends. Disposed in the housing 26 is an angular member 29 having an angular portion 30 provided with an opening through which the plunger 23 extends, the lower end of the member 29 bearing upon the top flange of the frame 11.

The inner end of the plunger 23 is provided with a screw thread 31, and threaded upon the thread of the plunger is an annular nut 32. Co-operating with the nut 32 are pairs of yoke members 33 and 34, each of which is of elongated formation and provided at its opposite ends with inturned flanges 35 and 36, the exterior surface of each yoke member being angular in cross section as best shown in Figure 3, the yoke members 33 having the flanges 35 bearing upon the top surfaces of the nut 32, while the opposite flanges 36 bear upon the lower end of a coiled spring 37 disposed about the threaded portion of the plunger 23 while the opposite end of the spring 37 bears against the nut 32. The yokes 34 have their lower flanges 36 bearing against the under surface of the nut 32, while the opposite flanges 35 provide means against which the upper end of the spring 38 bears, the opposite end of said spring bearing against the nut 32, being seated upon the flanges 35 of the yokes 33, while the spring 37 rests against the flanges 36 of the yokes 34.

In operation, relative movement between the spring assembly 12 and the frame member 10 will effect corresponding movement of the plunger 23, and assuming said movement to be such as to reciprocate the plunger 23 upwardly, said movement is transmitted to the nut 32, which carries therewith the yokes 33 compressing the spring 37 against the bottom flanges of the yokes 34, while the upward movement of the yokes 33 compresses the spring 28 against the upper flanges 35 of the yoke members 34 which in turn bear against the closed end of the housing, this movement resulting in rotation of the nut which is resisted by the frictional engagement of the ends of the yokes which in turn are cushioned by the resilient elements, bringing about a combined frictional resistance aided by the combined effect of the springs 37 and 38, thereby cushioning the shock in a simple and effective manner. The reciprocation of the plunger 23 in the opposite direction effects a reversal of the movements above described, downward movements of the yokes 33 being prevented by abutment with the stop 29 provided in the housing. If there is a change in the relative position of axle and chassis, due to a change in weight, the nut 32 will automatically take up a central position, each spring having the same overall length.

Referring now to Figure 6 there is shown a somewhat different embodiment of the invention. In this construction there is provided a member 50 bolted to the spring assembly 51, said member being provided with an opening to permit the passage therethrough of the axle housing 52, said axle housing being provided with a seat 53 which projects into the chamber 54 formed by the upper end of the holding member 50. A pad of rubber 55 is disposed on the seat 53, and on the upper surface of the rubber there is provided a steel plate 56. A plunger 57 is provided with an enlarged head 58 having convex inner and outer surfaces, the outer surface being adapted to bear upon the plate 56, and the opposite surface being adapted to bear upon a plate 59 which in turn bears against a rubber pad 60. The pad 60 bears against the under surface of the top wall of the housing provided by the member 50, said top wall having an aperture 61 through which extends the shank of the plunger 57 the aperture 61 being sufficiently large to permit some lateral movement of the plunger 57. The plunger 57 extends through suitable apertures in the frame 62. The frame 62 is in the form of the usual channel member, and disposed between the flanges of the channel member is a filler block 63 having an opening therein for the passage of the plunger 57, the filler block being riveted to the web of the channel member 62 as indicated at 64. The plunger 57 has its upper end threaded, and threaded on the upper end of the plunger 57 is a nut 65 which is preferably square in cross section, said nut being mounted for reciprocation in a housing 66 which is also square in cross section. The housing 66 rests upon the upper flange of the channel member 62, and has an extension 67, by which the same is secured in position, the same rivets being employed for this purpose which are utilized for securing the filler block in position. A coiled spring 68 is interposed between the closed top of the housing 66 and the nut 65, a suitable washer 69 being interposed between the inner end of the spring 68 and the top surface of the nut 65. A coiled spring 70 similar to the spring 68 is interposed between the lower surface of the nut 65 and the top flange of the member 62, a washer 71 being interposed between the upper end of the spring 70 and the bottom surface of the nut 65.

In operation upon relative movement between the spring assembly 51 and the frame member 62 reciprocation of the plunger 57 is brought about. Assuming said reciprocation to be in an upward direction, due to the threaded connection of the plunger with the nut which is slidably but non-rotatably held in the housing 66 rotation of the plunger 57 will be effected, and during this action longitudinal movement of said plunger will be resisted by the spring 68. Movement of the plunger in the reverse direction will effect a reversal of this action.

While I have herein shown and described what I consider the preferred manner in carrying out the invention, the same is merely illustrative, and I contemplate all changes and modifications which come within the scope of the claims appended hereto.

I claim:

1. In a friction shock absorbing mechanism, the combination with relatively movable members; of a shell connected to one of said members, and a plunger connected to the other member and extending into said shell; bearing means in said shell against which said plunger bears; yieldable means adapted to provide resistance at opposite sides of said bearing means; and means for simultaneously flexing said yieldable means upon movement of said plunger in opposite directions to afford resistance to the travel thereof.

2. In a friction shock absorbing mechanism, the combination with relatively movable members; of a shell connected to one of said members, and a plunger connected to the other member and extending into said shell; bearing means in said shell against which said plunger bears; yieldable means adapted to provide resistance at opposite sides of said bearing means; and means for simultaneously flexing said yieldable means upon movement of said plunger in opposite directions to afford resistance to the travel thereof, said bearing means and said plunger being relatively movable and having means producing frictional resistance upon relative movement therebetween.

3. In a friction shock absorbing mechanism of the character described, the combination with relatively movable members; of a shell connected to one of said members, and a plunger connected to the other of said member and extending into said shell; means in said shell against which said plunger bears, said means and said plunger having a threaded connection and arranged to have relative movement; yieldable means bearing against opposite sides of said bearing means and against fixed portions of said shell; and means for simultaneously flexing said yieldable means upon movements of said plunger in opposite directions.

4. In a friction shock absorbing mechanism, the combination with a frame member and spring member of a vehicle; of a housing affixed to one of said members, and a plunger affixed to the other of said members and extending into said housing; a nut mounted in said housing and threaded on said plunger, said plunger and said nut being arranged to have relative movement with respect to each other; and yieldable means arranged in said housing and bearing upon opposite sides of said nut.

5. In a shock absorbing mechanism of the character described, the combination with a frame member and spring member; of a housing affixed to one of said members and a plunger element affixed to the other of said members, said plunger element and said other member having a connection permitting limited lateral movement of said plunger element in various directions; a threaded element in said housing having a threaded connection with said plunger element; means for maintaining one of said elements against rotation during reciprocation of said plunger element; and yieldable means arranged at opposite sides of said threaded element to provide resistance to movement thereof within said housing.

6. In a shock absorbing mechanism for automobiles, the combination with the frame and spring member for directly supporting the vehicle frame; of a housing affixed to said frame and extending above the same, said housing being closed at the top and open at the bottom; a plunger connected to said spring member below said frame and extending above said frame, into said housing, the portion of said plunger within said housing being threaded; a nut held against rotation in said housing and threaded on said plunger; and resilient means arranged at opposite sides of said nut in said housing and adapted to bear thereon.

7. In a shock absorbing mechanism for automobiles, the combination with the frame and spring member thereof; of a housing affixed to said frame and extending above the same, said housing being closed at the top and open at the bottom; a plunger connected to said spring member below said frame and extending above said frame, into said housing, the portion of said plunger within said housing being threaded; a nut in said housing threaded on said plunger; and resilient means arranged at opposite sides of said nut in said housing and adapted to bear thereon, a portion of said plunger being off-set to clear said frame.

8. In a shock absorbing mechanism of the character described, the combination with a frame member and a spring member; of a housing affixed to said frame member, said housing being arranged substantially in line with said frame member; a plunger having a connection with said spring member to permit lateral movement in various directions, said plunger extending upwardly into said housing, and having a threaded portion; a nut disposed in said housing and threaded on said plunger; and yieldable means arranged at opposite sides of said nut and bearing thereon and against fixed portions of said housing and a portion of said frame.

9. In a shock absorbing mechanism of the character described, the combination with a frame member and spring member; of a housing affixed to one of said members and a plunger connected to the other of said members, said plunger extending into said housing; an element in said housing threaded on said plunger; yoke means having opposite end portions bearing upon opposite sides of said threaded element; and yieldable means disposed at opposite sides of said threaded member and arranged between the opposite surfaces of said threaded member and the adjacent portions of said yoke means.

10. In a shock absorbing mechanism of the character described, the combination with a frame member and spring member; of a housing affixed to one of said members and a plunger connected to the other of said members, said plunger extending into said housing; an element in said housing threaded on said plunger; yoke means having opposite end portions bearing upon opposite sides of said threaded element; and yieldable means disposed at opposite sides of said threaded member and arranged between the opposite surfaces of said threaded member and the adjacent portions of said yoke means, said housing being polygonal in cross section and said yokes fitting in said housing to prevent rotation thereof, said yokes having surfaces arranged to permit rotation of said threaded member.

In witness that I claim the foregoing I have hereunto subscribed my name this 19th day of August, 1926.

JOHN F. O'CONNOR.